T. O. WERNER.
HOISTING APPARATUS.
APPLICATION FILED MAY 3, 1909.
958,049.
Patented May 17, 1910.
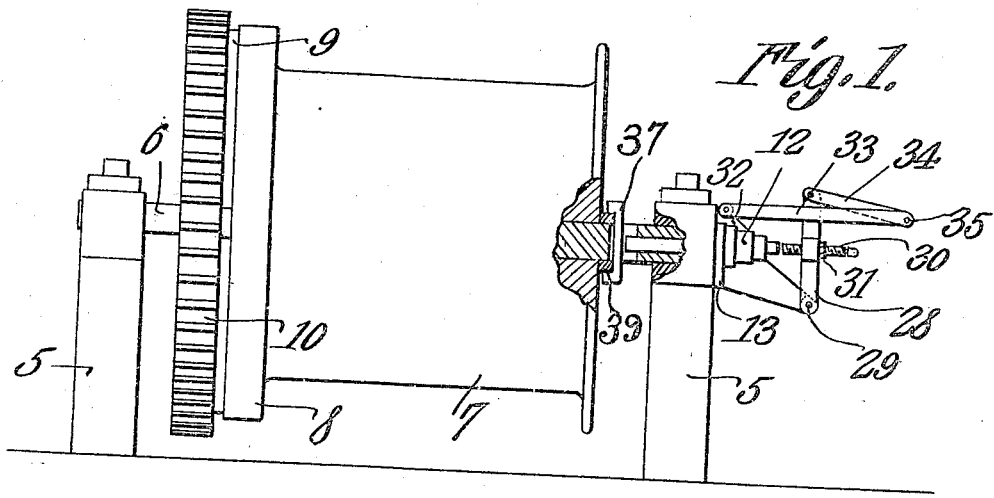
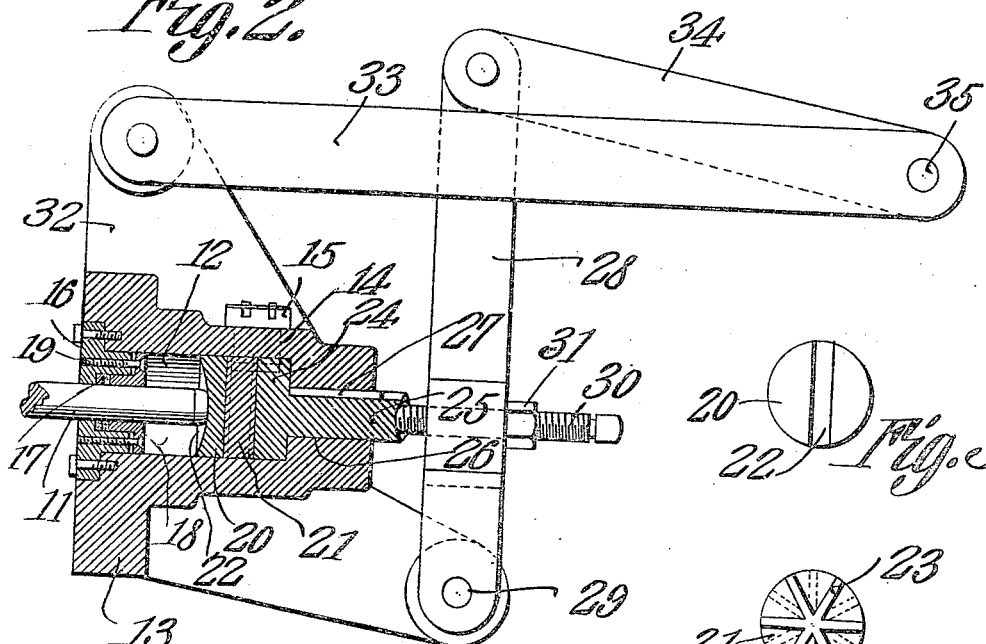
Witnesses
Inventor
Thomas O. Werner.
By
Attorneys

UNITED STATES PATENT OFFICE.

THOMAS ODENWELDER WERNER, OF BANGOR, PENNSYLVANIA.

HOISTING APPARATUS.

958,049.   Specification of Letters Patent.   Patented May 17, 1910.

Application filed May 3, 1909. Serial No. 493,637.

*To all whom it may concern:*

Be it known that I, THOMAS ODENWELDER WERNER, a citizen of the United States, residing at Bangor, in the county of Northampton and State of Pennsylvania, have invented a new and useful Hoisting Apparatus, of which the following is a specification.

This invention relates to that class of hoisting apparatus characterized by a friction drum which is thrown into and out of gear by a lateral sliding movement on its shaft.

The object of the present invention is to provide an improved mechanism for moving the drum along the shaft for the purpose stated, said mechanism being designed to reduce friction to a minimum, and also to provide improved means for actuating said mechanism.

With the foregoing objects in view the invention consists in the novel construction and arrangement of parts to be hereinafter described and claimed, reference being had to the drawing hereto annexed forming a part of this specification in which—

Figure 1 is an elevation of the apparatus with parts broken away showing the application of the invention. Fig. 2 is an enlarged sectional detail of the mechanism for moving the drum laterally on its shaft. Figs. 3 and 4 are face views of the antifriction members to be hereinafter described. Fig. 5 is a perspective view of the push pin hereinafter referred to.

Referring more particularly to the drawing, 5 denotes a pair of bearing standards which support the shaft 6 on which the drum 7 is mounted. The drum is loose on the shaft and is adapted to be operatively connected thereto by being slid laterally thereon so as to bring its friction rim 8 into engagement with the friction surface 9 on a gear 10 made fast to the shaft, the drum thus being made to rotate with the shaft when the two friction clutch members are set. The shaft is driven by a pinion (not shown) mounted on or geared to the crank shaft of the engine.

At 11 is shown a pin for sliding the drum 7 along the shaft to set the clutch members. This pin works in a bore 12 of a bearing casting 13 mounted on one of the standards 5. The casting is provided with an opening 14 through which a suitable lubricant may be introduced, and said opening is provided with a hinged closure 15. In order to prevent the lubricant from working out of the bore, one end thereof is provided with a stuffing box 16 through which the pin 11 extends. The stuffing box contains a suitable packing 17 which is compressed by means of a gland 18 clamped to the stuffing box by bolts 19. In the bore 12 is also mounted a pair of disks 20 and 21. The disk 20 has one of its faces in engagement with the inner end of the pin 11, and said face contains a transverse groove 22 engageable by the inner end of the pin, said end being shaped to fit the groove, whereby the disk is made to rotate with the pin when the drum is in gear. The disk 21 has its opposite faces provided with a plurality of radially extending grooves 23 which are for the purpose of receiving a lubricant. Within the bore 12 is mounted a third disk indicated at 24 from one face of which projects a stem 25. This stem extends through a reduced portion 26 of the bore 12 and is held against rotation by a key 27 or other suitable means. The stem is however free to slide in the bore 26, the keyway being of sufficient length to permit this sliding movement. The disk 21 fits snugly between the disks 20 and 24, and inasmuch as the rear end of the pin 11 is in contact with the disk 20, it will be seen that upon sliding the stem 27 forwardly, the pin will also be pushed forwardly, and as said pin slides the drum along the shaft the clutch members are set into driving contact.

The means for operating the stem 27 comprise a lever 28 fulcrumed at 29 to a bracket arm projecting from the casting 13, and carrying a pin 30 adapted to be brought into contact with the outer end of the stem, said stem being concaved in order that a better contact may be made. The pin 30 is screw-threaded and screws into an opening in the lever which permits the necessary adjustment. The pin is held at adjustment by means of a jam nut 31. On the casting 13 is another bracket arm 32 to which is fulcrumed a second lever 33 which is connected to the lever 28 by a link 34. By means of this arrangement of levers and the link, the pin 30 will be made to push against the stem 27 upon swinging the lever 33 upwardly, a suitable operating lever being connected thereto at 35.

The connection between the pin 11 and the drum 7 may be made in various ways. Fig. 1 shows one form of connection. The pin extends into an axial bore 36 made in the end of the drum shaft 6, and is engageable with key 37 mounted in a slot 38 in said shaft. Between the key and the end of the drum is a collar 39. The motion of the pin when it is pushed forwardly as stated, is communicated to the drum through the key and the collar. Any other suitable connection may be provided, the same not forming a part of the present invention.

By the herein described arrangement of parts, the pin 11 is easily actuated, and the arrangement of parts within the bore 12 reduces friction to a minimum. The disks 20 and 24 will be of cast steel, and the disk 21 will be of bronze.

What is claimed is:

1. The combination with friction clutch members, of means for setting said members in driving contact comprising a bearing, a pin rotatably and slidably mounted therein, and engageable at one end with one of the clutch members, a pair of disks mounted in the bearing, one of said disks being connected to the pin to rotate therewith, an operating device engageable with the other disk, and a disk interposed between said disks.

2. The combination with friction clutch members, of means for setting said members in driving contact comprising a bearing, a pin rotatably and slidably mounted therein, and engageable at one end with one of the clutch members, a pair of disks mounted in the bearing, one of said disks being connected to the pin to rotate therewith, and the other disk being slidably mounted in the bearing, and held against rotary movement, an operating device engageable with the last mentioned disk, and a disk interposed between said disks.

3. The combination with friction clutch members, of means for setting said members in driving contact comprising a bearing, a pin rotatably and slidably mounted therein, and engageable at one end with one of the clutch members, a pair of disks mounted in the bearing, one of said disks being connected to the pin and rotatable therewith, a stem projecting from the other disk, an operating device engageable with the stem, and a disk interposed between the aforesaid disks.

4. The combination with friction clutch members, of means for setting said members in driving contact comprising a bearing, a pin rotatably and slidably mounted in the bearing, and engageable at one end with one of the clutch members, a lever fulcrumed on the bearing, and carrying a pin, a pair of disks mounted in the bearing, one of said disks being grooved to receive the end of the pin, a stem projecting from the other disk and engageable by the pin carried by the lever, means for holding the stem against rotation, and an intermediate disk having its opposite faces grooved.

In testimony that I claim the foregoing as my own, I have hereto affixed my signature in the presence of two witnesses.

THOMAS ODENWELDER WERNER.

Witnesses:
W. H. LINDEMAN,
FLORENCE C. BROWN.